3,010,965
1,1,2 - TRIS - ARYL - 3 - TERTIARY - AMINO - 1 - PROPENES, INTERMEDIATES, AND PREPARATION THEREOF
Bill Elpern, Walnut Creek, Calif., assignor to Sterling Drug Inc., New York, N.Y., a corporation of Delaware
No Drawing. Filed Feb. 5, 1957, Ser. No. 638,200
15 Claims. (Cl. 260—293)

This invention relates to amino substituted triphenylethylene derivatives, and is particularly concerned with 1,1,2-tris-aryl-3-tertiary-amino-1-propenes, salts thereof, and with a process for their preparation. The invention also relates to intermediates useful in the preparation of said propenes.

Among the compounds included within the scope of my invention are those having the formula

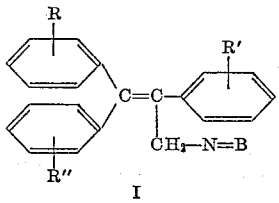

I wherein R and R' represent hydrogen, lower-alkyl, lower-alkoxy, lower-alkylmercapto or halogen radicals, R" represents hydrogen, lower-alkyl, lower-alkoxy or lower-alkylmercapto radicals, and N=B represents a basic, aliphatic-type, tertiary-amino radical.

When R, R' and R" in the above general Formula I represent lower-alkyl, lower-alkoxy or lower-alkylmercapto radicals, they preferably contain from one to about four carbon atoms, and thus represent such specific radicals as methyl, ethyl, propyl, isopropyl, butyl, isobutyl, tertiary-butyl, methoxy, ethoxy, propoxy, isopropoxy, butoxy, isobutoxy, methylmercapto, ethylmercapto, propylmercapto, isopropylmercapto, butylmercapto, isobutylmercapto, and the like. When R and R' represent halogen they stand for any of the four halogens, fluorine, chlorine, bromine or iodine. In any given compound, R, R' and R" can be the same or different and can be in any of the available positions in the benzene ring.

In the above general Formula I, N=B represents a basic, aliphatic-type, tertiary-amino radical. These tertiary-amines are sufficiently basic to form readily acid-addition salts with inorganic or organic acids, and are of the type —N(Y)(Y') wherein Y and Y' are aliphatic substituents such as lower-alkyl, cycloalkyl, alkenyl and the like or where Y and Y' are joined to form a non-aromatic type heterocyclic ring. A preferred group of N=B includes the radicals di-lower-alkylamino, 1-piperidyl, 1-pyrrolidyl, and 4-morpholinyl, and lower-alkylated derivatives of said 1-piperidyl, 1-pyrrolidyl and 4-morpholinyl radicals. In the di-lower-alkylamino radicals the lower-alkyl radicals can have from one to about six carbon atoms and can be the same or different.

The compounds of my invention are prepared according to the following reaction scheme:

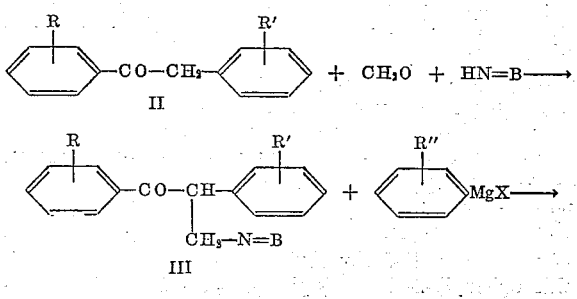

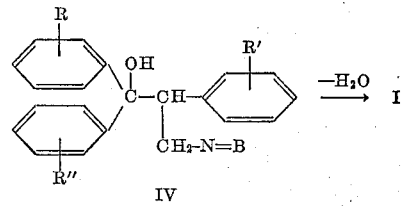

IV

The starting materials of Formula II belong to a known class of desoxybenzoin derivatives, and are readily prepared by a Friedel-Crafts reaction between a phenylacetyl chloride, ClCOCH$_2$C$_6$H$_4$R', and benzene or a derivative thereof, RC$_6$H$_5$. The desoxybenzoin (II) is reacted with formaldehyde and a secondary-amine,

HN=B either in the free base form or acid-addition salt form, and a 1,2-bis-aryl-3-tertiary-amino-1-propanone (III) is thus obtained. The reaction is carried out under conditions commonly used for the Mannich reaction, e.g., in the presence of an inert reaction medium at a temperature between about 50° C. and 150° C. Some of the amino ketones of Formula III are disclosed and claimed in my copending application, Serial No. 638,430, filed February 6, 1957.

The amino ketone (III) is then reacted with a Grignard reagent, R"C$_6$H$_4$MgX, wherein X is halogen selected from chlorine, bromine and iodine, and the resulting intermediate complex is hydrolyzed to produce an amino carbinol of Formula IV. The Grignard reaction is carried out in an inert reaction medium at a temperature between 0° C. and 150° C.

The amino carbinol (IV), either in the free base form or acid-addition or quaternary ammonium salt form, is dehydrated by contacting it with dehydrating agents to produce a compound of Formula I. The dehydrating agents are generally of an acidic nature and can be mineral acids, such as hydrochloric, sulfuric or phosphoric acid; organic acids, such as formic acid, acetic acid, oxalic acid, or p-toluenesulfonic acid; salts such as potassium hydrogen sulfate or zinc chloride; or anhydrides, such as phosphorus pentoxide or acetic anhydride. Heat may be applied if desired to speed up the reaction, although in some cases the dehydration takes place readily at room temperature.

The compounds of the invention are most conveniently used in the form of water-soluble, non-toxic acid-addition and quaternary ammonium salts. Non-toxic salts are therapeutically acceptable salts whose anions are relatively innocuous to animal organisms in therapeutic doses of the salts, so that the beneficial physiological properties inherent in the free bases are not vitiated by side-effects ascribable to the anions; in other words, the latter do not substantially increase the toxicity inherent in the cations. Appropriate acid-addition salts are those derived from mineral acids such as hydrochloric acid, hydrobromic acid, hydriodic acid, nitric acid, sulfuric acid, and phosphoric acid; and organic acids such as acetic acid, citric acid, lactic acid, tartar acid, ethanesulfonic acid, and quinic acid. The quaternary ammonium salts are obtained by the addition of esters of strong acids to the free base form of the compounds. A preferred class of esters comprises alkyl, alkenyl, and aralkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The acid-addition salts are prepared either by dissolving the free base in an aqueous solution containing the appropriate acid, and isolating the salt by evaporating the solution, or by reacting the free base and acid in an organic solvent, in which case the salt separates directly or can be obtained by concentration of the solution.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be obtained.

The invention also contemplates the intermediate 1,1,2-tris-substituted-aryl-3-(tertiary-amino)-1-propanols having the general Formula IV, wherein R and R' represent lower-alkoxy, lower-alkylmercapto or halogen radicals, and R'' represents lower-alkoxy or lower-alkylmercapto radicals, and acid-addition and quaternary ammonium salts thereof. The invention also relates to the preparation of these intermediates by the reaction of a 1,2-bis-substituted-aryl-3-(tertiary-amino)-1-propanone of Formula III with a substituted-phenylmagnesium halide and hydrolyzing the intermediate complex.

The structures of the compounds of the invention are established by the mode of their preparation and by chemical analysis. The structures of the compounds of Formula I are further confirmed by ultraviolet and infrared spectra, which demonstrate the presence of a stilbene structure.

The following examples will further illustrate the invention without limiting the same thereto.

EXAMPLE 1

(a) 1,2-bis(4-methoxyphenyl)-3-dimethylamino-1-propanone

[III; R, R' are 4-$CH_3O$, N=B is $N(CH_3)_2$]

A mixture of 77 g. (0.3 mole) of desoxyanisoin, 25.6 g. (0.314 mole) of dimethylamine hydrochloride and 18 g. of paraformaldehyde in 250 ml. of absolute ethanol was refluxed for thirty hours. Another 2 g. of paraformaldehyde was added, and the mixture was refluxed for twelve hours longer. After standing for four hours at room temperature, 1 liter of dry ether was added to the mixture in order to precipitate the hydrochloride salt of the desired product. The latter was collected by filtration, dissolved in 750 ml. of water and made basic with 100 ml. of 35% sodium hydroxide solution. The product which had separated after cooling in the refrigerator for about fifteen hours was collected by filtration and dried, giving 70.7 g. of 1,2-bis(4-methoxyphenyl)-3-dimethylamino-1-propanone, M.P. 47–48° C.

The hydrochloride salt of 1,2-bis(4-methoxyphenyl)-3-dimethylamino-1-propanone, prepared by the addition of excess 10% alcoholic hydrogen chloride to a sample of the free base dissolved in absolute ethanol, had the M.P. 166.5–167.5° C. (corr.) when recrystallized from an ethanol-ether mixture.

Analysis.—Calcd. for $C_{19}H_{23}NO_3 \cdot HCl$: C, 65.23; H, 6.92; Cl, 10.14. Found: C, 65.04; H, 6.83; Cl, 10.04.

By replacement of the desoxyanisoin in the preceding preparation by a molar equivalent amount of 4,4'-diethoxydesoxybenzoin, p-methoxyphenyl p-ethoxybenzyl ketone, p-chlorophenyl m-methylbenzyl ketone, or 4,4'-bis(methylmercapto)desoxybenzoin, there can be obtained, respectively, 1,2-bis(4-ethoxyphenyl)-3-dimethylamino-1-propanone [III; R, R' are 4-$C_2H_5O$, N=B is $N(CH_3)_2$], 1-(4-methoxyphenyl)-2-(4-ethoxyphenyl)-3-dimethylamino-1-propanone [III; R is 4-$CH_3O$, R' is 4-$C_2H_5O$, N=B is $N(CH_3)_2$], 1-(4-chlorophenyl)-2-(3-methylphenyl)-3-dimethylamino-1-propanone [III; R is 4-Cl, R' is 3-$CH_3$, N=B is $N(CH_3)_2$], or 1,2-bis(4-methylmercaptophenyl)-3-dimethylamino-1-propanone [III; R, R' are 4-$CH_3S$, N=B is $N(CH_3)_2$].

By replacement of the dimethylamine hydrochloride in the preceding preparation by a molar equivalent amount of diethylamine hydrochloride, dipropylamine hydrochloride, methylethylamine hydrochloride, dibutylamine hydrochloride, dihexylamine hydrochloride, piperidine hydrochloride, pyrrolidine hydrochloride, morpholine hydrochloride, or 2-methylpiperidine hydrochloride, there can be obtained, respectively, 1,2-bis(4-methoxyphenyl)-3-diethylamino-1-propanone [III; R, R' are 4-$CH_3O$, N=B is $N(C_2H_5)_2$], 1,2-bis(4-methoxyphenyl)-3-dipropylamino-1-propanone [III; R, R' are 4-$CH_3O$, N=B is $N(C_3H_7)_2$], 1,2-bis(4-methoxyphenyl)-3-methylethylamino-1-propanone [III; R, R' are 4-$CH_3O$, N=B is $N(CH_3)(C_2H_5)$], 1,2-bis(4-methoxyphenyl)-3-dibutylamino-1-propanone [III; R, R' are 4-$CH_3O$, N=B is $N(C_4H_9)_2$], 1,2-bis(4-methoxyphenyl)-3-dihexylamino-1-propanone [III; R, R' are 4-$CH_3O$, N=B is $N(C_6H_{13})_2$], 1,2-bis(4-methoxyphenyl)-3-(1-piperidyl)-1-propanone [III; R, R' are 4-$CH_3O$, N=B is $NC_5H_{10}$], 1,2-bis(4-methoxyphenyl)-3-(1-pyrrolidyl)-1-propanone [III; R, R' are 4-$CH_3O$, N=B is $NC_4H_8$], 1,2-bis(4-methoxyphenyl)-3-(4-morpholinyl)-1-propanone [III; R, R' are 4-$CH_3O$, N=B is $NC_4H_8O$], or 1,2-bis(4-methoxyphenyl)-3-(2-methyl-1-piperidyl)-1-propanone [III; R, R' are 4-$CH_3O$, N=B is $NC_5H_9(CH_3)$]

(b) 1,1,2-tris(4-methoxyphenyl)-3-dimethylamino-1-propanol

[IV; R, R', R'' are 4-$CH_3O$, N=B is $N(CH_3)_2$]

A solution of 4-methoxyphenylmagnesium bromide [prepared from 56.1 g. (0.3 mole) of 4-bromoanisole and 7.2 g. (0.3 mole) of magnesium in 250 ml. of dry ether] was treated at 0° C. with a solution of 31.3 g. (0.1 mole) of 1,2-bis(4-methoxyphenyl)-3-dimethylamino-1-propanone in 400 ml. of toluene. The ether was removed by distillation, and the remaining mixture was refluxed (internal temperature 108° C.) for three hours. After standing at room temperature for about fifteen hours, the mixture was hydrolyzed by pouring it into 1 liter of ice water containing 275 g. of ammonium chloride. The organic layer was separated, the aqueous layer extracted with three 75 ml. portions of benzene, and the combined organic solutions washed twice with water. The solvent was removed in vacuo, the residue triturated with absolute alcohol and filtered. The alcoholic filtrate was concentrated in vacuo, giving 63.5 g. of 1,1,2-tris(4-methoxyphenyl)-3-dimethylamino-1-propanol, in the form of a dark red oil. The methiodide of 1,1,2-tris(4-methoxyphenyl)-3-dimethylamino-1-propanol, prepared by heating a portion of the free base in benzene solution with an excess of methyl iodide, had the M.P. 194.5–197° C. (corr.) when recrystallized twice from an ethyl acetate-methanol mixture.

Analysis.—Calcd. for $C_{27}H_{34}INO_4$: C, 57.57; H, 6.08; I, 22.52. Found: C, 57.30; H, 6.20; I, 22.08.

By replacement of the 1,2-bis(4-methoxyphenyl)-3-dimethylamino-1-propanone in the preceding preparation by a molar equivalent amount of 1,2-bis(4-ethoxyphenyl)-3-dimethylamino-1-propanone, 1-(4-methoxyphenyl)-2-(4-ethoxyphenyl)-3-dimethylamino-1-propanone, 1-(4-chlorophenyl)-2-(3-methylphenyl)-3-dimethylamino-1- propanone, 1,2-bis(4-methylmercaptophenyl)-3-dimethylamino-1-propanone, 1,2-bis(4-methoxyphenyl)-3-diethylamino-1-propanone, 1,2 - bis(4-methoxyphenyl)-3-dipropylamino-1-propanone, 1,2-bis(4-methoxyphenyl)-3-methylethylamino - 1 - propanone, 1,2 - bis(4 - methoxyphenyl) - 3 - dibutylamino - 1 - propanone, 1,2 - bis(4-methoxyphenyl)-3-dihexylamino-1-propanone, 1,2-bis(4-methoxyphenyl)-3-(1-piperidyl)-1-propanone, 1,2-bis(4-methoxyphenyl)-3-(1-pyrrolidyl)-1-propanone, 1,2-bis(4-methoxyphenyl)-3-(4-morpholinyl)-1-propanone, or 1,2-bis(4-methoxyphenyl)-3-(2-methyl-1-piperidyl) - 1 - propanone, there can be obtained, respectively, 1,2-bis(4-ethoxyphenyl)-1-(4-methoxyphenyl)-3-dimethylamino - 1 - propanol [IV; R, R' are 4-$C_2H_5O$, R'' is 4-$CH_3O$, N=B is $N(CH_3)_2$], 1,2-bis(4-methoxyphenyl)-2-(4-ethoxyphenyl)-3-dimethylamino-1-propanol [IV; R, R'' are 4-$CH_3O$, R' is 4-$C_2H_5O$, N=B is $N(CH_3)_2$], 1-(4-chlorophenyl)-1-(4 - methoxyphenyl)-2-(3-methylphenyl)-3-dimethylamino-1-propanol [IV; R is 4-Cl, R' is 3-$CH_3$, R'' is 4-$CH_3O$, N=B is $N(CH_3)_2$], 1,2-bis(4-methylmercaptophenyl)-1-(4-methoxyphenyl)-3-dimethylamino-1-propanol [IV; R, R' are 4-$CH_3S$, R'' is 4-$CH_3O$, N=B is $N(CH_3)_2$], 1,1,2-tris(4-methoxyphenyl)-3-diethylamino-1-propanol [IV; R, R', R'' are 4-$CH_3O$, N=B is $N(C_2H_5)_2$] 1,1,2-tris(4-methoxyphenyl)-3-dipropylamino-1-propanol [IV; R, R', R'' are 4-$CH_3O$, N=B is $N(C_3H_7)_2$], 1,1,2-tris(4-methoxyphenyl)-3-methylethylamino-1-propanol [IV; R, R', R'' are 4-$CH_3O$, N=B is $N(CH_3)(C_2H_5)$], 1,1,2-tris(4-methoxyphenyl)-3-dibutylamino-1-propanol [IV; R, R', R'' are 4-$CH_3O$, N=B is $N(C_4H_9)_2$], 1,1,2-tris(4-methoxyphenyl)-3-dihexylamino-1-propanol [IV; R, R', R'' are 4-$CH_3O$, N=B is $N(C_6H_{13})_2$], 1,1,2-tris(4-methoxyphenyl)-3-(1-piperidyl)-1-propanol [IV; R, R', R'' are 4-$CH_3O$, N=B is $NC_5H_{10}$], 1,1,2-tris(4-methoxyphenyl)-3-(1-pyrrolidyl)-1-propanol [IV; R, R', R'' are 4-$CH_3O$, N=B is $NC_4H_8$], 1,1,2-tris(4-methoxyphenyl)-3-(4-morpholinyl)-1-propanol [IV; R, R', R'' are 4-$CH_3O$, N=B is $NC_4H_8O$], or 1,1,2-tris(4-methoxyphenyl)-3-(2-methyl-1-piperidyl)-1-propanol [IV; R, R', R'' are 4-$CH_3O$, N=B is $NC_5H_9(CH_3)$].

(c) *1,1,2-tris(4-methoxyphenyl)-3-dimethylamino-1-propene*

[I; R, R', R'' are 4-$CH_3O$, N=B is $N(CH_3)_2$]

A solution of 10.8 g. of 1,1,2-tris(4-methoxyphenyl)-3-dimethylamino-1-propanol in 50 ml. of absolute ethanol was saturated with hydrogen chloride gas. The solution was concentrated, and the residue was dried by adding ethyl acetate and benzene and again concentrating the solution. The residue was crystallized from an ethyl acetate-ether mixture and then recrystallized from absolute ethanol to give 1,1,2-tris(4-methoxyphenyl)-3-dimethylamino-1-propene in the form of its hydrochloride salt, M.P. 182–184° C. (corr.).

*Analysis.*—Calcd. for $C_{26}H_{29}NO_3 \cdot HCl$: C, 70.97; H, 6.86; Cl, 8.06. Found: C, 70.42; H, 6.61; Cl, 8.02.

The free base, 1,1,2-tris(4-methoxyphenyl)-3-dimethylamino-1-propene, can be prepared by treating an aqueous solution of its hydrochloride salt with an excess of sodium hydroxide solution, and extracting the resulting base. The free base can then be reacted with various acids and esters, e.g., hydrobromic acid, quinic acid, ethanesulfonic acid, methyl iodide, ethyl bromide, or benzyl chloride, to give, respectively, the hydrobromide, quinate, ethanesulfonate, methiodide, ethobromide, or benzochloride salts of 1,1,2 - tris(4-methoxyphenyl)-3-dimethylamino-1-propene.

By replacement of the 1,1,2-tris(4-methoxyphenyl)-3-dimethylamino-1-propanol in the preceding preparation by a molar equivalent amount of 1,2-bis(4-ethoxyphenyl)-1-(4 - methoxyphenyl)-3-dimethylamino-1-propanol, 1,2-bis(4-methoxyphenyl)-2-(4-ethoxyphenyl) - 3 - dimethylamino-1-propanol, 1-(4-chlorophenyl) - 1 - (4-methoxyphenyl)-2-(3-methylphenyl)-3-dimethylamino - 1 - propanol, 1,2-bis(4-methylmercaptophenyl)-1-(4-methoxyphenyl)-3-dimethylamino - 1 - propanol, 1,1,2-tris(4-methoxyphenyl)-3-diethylamino-1-propanol, 1,1,2-tris(4-methoxyphenyl)-3-dipropylamino-1-propanol, 1,1,2-tris(4-methoxyphenyl)-3-methylethylamino - 1 - propanol, 1,1,2-tris(4-methoxyphenyl)-3-dibutylamino-1-propanol, 1,1,2-tris(4-methoxyphenyl)-3-dihexylamino-1-propanol, 1,1,2-tris(4-methoxyphenyl)-3-(1-piperidyl)-1-propanol, 1,1,2-tris(4-methoxyphenyl)-3-(1-pyrrolidyl)-1-propanol, 1,1,2-tris(4-methoxyphenyl)-3-(4-morpholinyl)-1-propanol, or 1,1,2-tris(4-methoxyphenyl)-3-(2-methyl-1-piperidyl) - 1 - propanol, there can be obtained, respectively, 1,2-bis(4-ethoxyphenyl)-1-(4-methoxyphenyl) - 3 - dimethylamino-1-propene [I; R, R' are 4-$C_2H_5O$, R'' is 4-$CH_3O$, N=B is $N(CH_3)_2$], 1,2-bis(4-methoxyphenyl)-2-(4 - ethoxyphenyl)-3-dimethylamino-1-propene [I; R, R'' are 4-$CH_3O$, R' is 4-$C_2H_5O$, N=B is $N(CH_3)_2$], 1-(4-chlorophenyl)-1-(4-methoxyphenyl)-2-(3-methylphenyl) - 3 - dimethylamino-1-propene [I; R is 4-Cl, R' is 3-$CH_3$, R'' is 4-$CH_3O$, N=B is $N(CH_3)_2$], 1,2-bis(4-methylmercaptophenyl)-1-(4-methoxyphenyl)-3-dimethylamino-1-propene [I; R, R' are 4-$CH_3S$, R'' is 4-$CH_3O$, N=B is $N(CH_3)_2$], 1,1,2-tris(4-methoxyphenyl)-3-diethylamino-1-propene [I; R, R', R'' are 4-$CH_3O$, N=B is $N(C_2H_5)_2$], 1,1,2-tris(4-methoxyphenyl)-3-dipropylamino-1-propene [I; R, R', R'' are 4-$CH_3O$, N=B is $N(C_3H_7)_2$], 1,1,2-tris(4-methoxyphenyl)-1-methylethylamino-1-propene [I; R, R', R'' are 4-$CH_3O$, N=B is $N(CH_3)(C_2H_5)$], 1,1,2-tris(4-methoxyphenyl)-3-dibutylamino-1-propene [I; R, R', R'' are 4-$CH_3O$, N=B is $N(C_4H_9)_2$], 1,1,2-tris(4-methoxyphenyl)-3-dihexylamino-1-propene [I; R, R', R'' are 4-$CH_3O$, N=B is $N(C_6H_{13})_2$], 1,1,2-tris(4-methoxyphenyl)-3-(1-piperidyl)-1-propene [I; R, R', R'' are 4-$CH_3O$, N=B is $NC_5H_{10}$], 1,1,2-tris(4-methoxyphenyl)-3-(1-pyrrolidyl)-1-propene [I; R, R', R'' are 4-$CH_3O$, N=B is $NC_4H_8$], 1,1,2-tris(4-methoxyphenyl)-3-(4-morpholinyl)-1-propene [I; R, R', R'' are 4-$CH_3O$, N=B is $NC_4H_8O$], or 1,1,2-tris(4-methoxyphenyl)-3-(2-methyl-1-piperidyl) - 1 - propene [I; R, R', R'' are 4-$CH_3O$, N=B is $NC_5H_9(CH_3)$].

EXAMPLE 2

(a) 1,2-diphenyl-3-(1-piperidyl)-1-propanone [III; R, R' are H, N=B is $NC_5H_{10}$] was prepared from 29.4 g. (0.15 mole) of desoxybenzoin, 19.5 g. (0.16 mole) of piperidine hydrochloride and 11.2 g. (0.335 mole) of paraformaldehyde according to the manipulative procedure described above in Example 1, part (a). The hydrochloride salt of the product did not crystallize from the reaction mixture, so the solvent was removed in vacuo and the residue stirred with ice and sodium hydroxide solution to convert the product to the free base. There was thus obtained 77.6 g. of 1,2-diphenyl-3-dimethylamino-1-propanone, M.P. 88–90° C. when recrystallized from ethanol.

*Analysis.*—Calcd. for $C_{20}H_{23}NO$: C, 81.86; H, 7.90; N, 4.78. Found: C, 81.94; H, 7.83; N, 4.76.

(b) 1,1,2-triphenyl-3-(1-piperidyl)-1-propanol [IV; R, R', R'' are H, N=B is $NC_5H_{10}$] was prepared from 7.3 g. (0.3 mole) of magnesium, 47.2 g. of bromobenzene and 29.3 g. (0.1 mole) of 1,2-diphenyl-3-(1-piperidyl)-1-propanone according to the manipulative procedure described above in Example 1, part (b). There was thus obtained 1,1,2-triphenyl-3-(1-piperidyl) - 1 - propanol, M.P. 170–170.5° C.

*Analysis.*—Calcd. for $C_{26}H_{29}NO$: N, 3.77. Found: N, 3.66.

(c) *1,1,2-triphenyl-3-(1-piperidyl)-1-propene*

[I; R, R', R'' are H, N=B is $NC_5H_{10}$]

A mixture of 2 g. (0.0054 mole) of 1,1,2-triphenyl-3-(1-piperidyl)-1-propanol and 1.5 g. (0.0087 mole) of p-toluenesulfonic acid was stirred for three hours at 120–125° C. The reaction mixture was cooled, 20 ml. of absolute ethanol was added, the mixture warmed to effect solution and then cooled in an ice bath. The product which separated was collected by filtration, washed with ether and dried at 75° C., giving 1,1,2-triphenyl-3-(1-piperidyl)-1-propene in the form of its p-toluenesulfonate salt, M.P. 210-212° C. (corr.).

*Analysis.*—Calcd. for $C_{26}H_{27}N \cdot C_7H_8O_3S$: C, 75.38; H, 6.71; S, 6.10. Found: C, 75.33; H, 6.55; S, 6.10.

The hydrochloride salt of 1,1,2-triphenyl-3-(1-piperidyl)-1-propene was obtained in the form of a white powder, M.P. 242-245.5° C. (corr.) when recrystallized from methyl isobutyl ketone; ultraviolet maxima at 228 and 272 m$\mu$, E=23,434 and 10,896.

Pharmacological evaluation of the compounds of the invention having the Formula I in their acid-addition salt forms has shown that they are useful as cardiac antiaccelerators and coronary dilators. They possess a mode of action somewhat similar to that of veratramine and thus are useful in treatment of hypertensive states. The compounds of the invention are, however, much less toxic than veratramine; for example, 1,1,2-tris(4-methoxyphenyl)-3-dimethylamino-1-propene was found to have an intravenous $LD_{50}$ value in mice of 30±1 mg./kg., and an oral $LD_{50}$ value of 385±85 mg./kg., whereas the values for veratramine are 3.68±0.24 mg./kg. and 13±2.1 mg./kg., respectively. 1,1,2-tris(4-methoxyphenyl)-3-dimethylamino-1-propene had an approximate effective dose ($AED_{50}$) of 31 micrograms per heart as a cardiac decelerator when measured upon the isolated rabbit heart and a coronary dilator activity of 2-2.6 times that of papaverine when measured upon the isolated, perfused rabbit heart. The compounds can be administered orally as tablets or capsules compounded with conventional excipients, or parenterally or intravenously as aqueous solutions.

I claim:
1. Compounds selected from the group consisting of (A) compounds having the formula

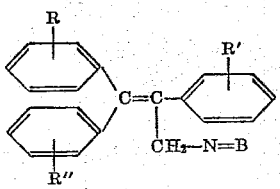

wherein R and R' represent a member of the group consisting of hydrogen, lower-alkyl, lower-alkoxy, lower-alkylmercapto and halogen, R" represents a member of the group consisting of hydrogen, lower-alkyl, lower-alkoxy and lower-alkylmercapto, and N=B represents a member of the group consisting of di-lower-alkylamino, 1-piperidyl, 1-pyrrolidyl, 4-morpholinyl, lower-alkylated 1-piperidyl, lower-alkylated 1-pyrrolidyl, and lower-alkylated 4-morpholinyl; (B) pharmacologically acceptable acid addition salts thereof; and (C) a member of the group consisting of pharmacologically acceptable lower-alkyl, lower-alkenyl and lower-aralkyl quaternary ammonium salts thereof.

2. Pharmacologically acceptable acid-addition salts of compounds having the formula

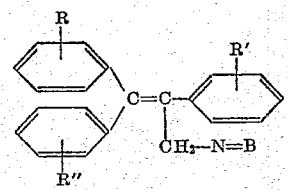

wherein R, R' and R" represent lower-alkoxy and N=B represents di-lower-alkylamino.

3. Compounds having the formula

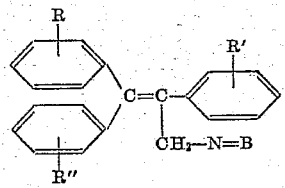

wherein R, R' and R" represent lower-alkoxy and N=B represents di-lower-alkylamino.

4. Pharmacologically acceptable acid-addition salts of 1,1,2 - tris(4 - methoxyphenyl) - 3 - dimethylamino - 1 - propene.

5. 1,1,2-tris(4-methoxyphenyl)-3-dimethylamino-1-propene.

6. 1,1,2-tris(4-methoxyphenyl)-3-dimethylamino-1-propene-hydrochloride.

7. 1,1,2-triphenyl-3-(1-piperidyl)-1-propene.

8. Pharmacologically acceptable acid-addition salts of 1,1,2-triphenyl-3-(1-piperidyl)-1-propene.

9. 1,1,2-triphenyl-3-(1-piperidyl-1-propene hydrochloride.

10. 1,1,2-triphenyl-3-(1-piperidyl)-1-propene p-toluenesulfonate.

11. The process for preparing a compound having the formula

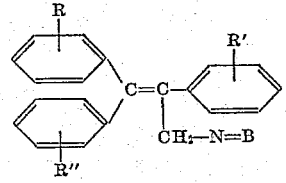

wherein R and R' represent a member of the group consisting of hydrogen, lower-alkyl, lower-alkoxy, lower-alkylmercapto and halogen, R" represents a member of the group consisting of hydrogen, lower-alkyl, lower-alkoxy and lower-alkylmercapto, and N=B represents a member of the group consisting of di-lower-alkylamino, 1-piperidyl, 1-pyrrolidyl, 4-morpholinyl, lower-alkylated 1-piperidyl, lower-alkylated 1-pyrrolidyl, and lower-alkylated 4-morpholinyl, which comprises contacting an acidic compound having the formula

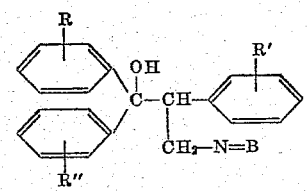

with a dehydrating agent.

12. The process for preparing a compound having the formula

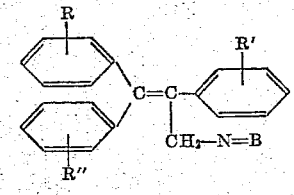

wherein R, R' and R" represent lower-alkoxy and N=B represents di-lower-alkylamino, which comprises contacting a compound having the formula

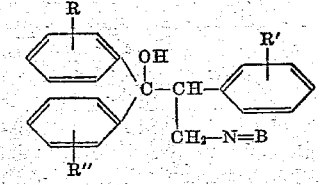

with an acidic dehydrating agent.

13. The process for preparing 1,1,2-tris(4-methoxyphenyl)-3-dimethylamino-1-propene which comprises contacting 1,1,2-tris(4-methoxyphenyl)-3-dimethylamino-1-propanol with an acidic dehydrating agent.

14. The process for preparing 1,1,2-triphenyl-3-(1-piperidyl)-1-propene which comprises contacting 1,1,2-triphenyl-3-(1-piperidyl)-1-propanol with an acidic dehydrating agent.

15. The process for preparing a compound having the formula

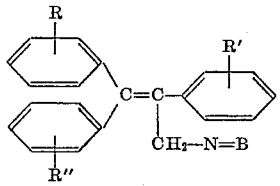

wherein R and R' represent a member of the group consisting of hydrogen, lower-alkyl, lower-alkoxy, lower-alkylmercapto and halogen, R" represents a member of the group consisting of hydrogen, lower-alkyl, lower-alkoxy and lower-alkylmercapto, and N=B represents a member of the group consisting of di-lower-alkylamino, 1-piperidyl, 1-pyrrolidyl, 4-morpholinyl, lower-alkylated 1-piperidyl, lower-alkylated 1-pyrrolidyl, and lower-alkylated 4-morpholinyl, which comprises reacting an acidic compound having the formula

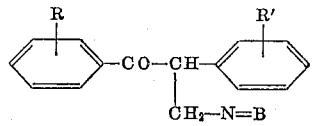

with a compound having the formula R"C₆H₄Mg-halide, hydrolyzing the intermediate complex, and contacting the resulting compound having the formula with an acidic dehydrating agent.

References Cited in the file of this patent

UNITED STATES PATENTS

| | | |
|---|---|---|
| 2,485,662 | Rohrmann | Oct. 25, 1949 |
| 2,515,700 | Denton et al. | July 18, 1950 |
| 2,599,497 | Stoll et al. | June 3, 1952 |

FOREIGN PATENTS

| | | |
|---|---|---|
| 624,117 | Great Britain | May 27, 1949 |
| 627,139 | Great Britain | July 29, 1949 |

UNITED STATES PATENT OFFICE
CERTIFICATE OF CORRECTION

Patent No. 3,010,965                          November 28, 1961

Bill Elpern

It is hereby certified that error appears in the above numbered patent requiring correction and that the said Letters Patent should read as corrected below.

Column 2, line 59, for "tartar" read -- tartaric --; column 6, line 26, for "-1-methylethylamino-" read -- -3-methylethylamino- --; column 8, line 22, for "(1-piperidyl-1-propene" read -- (1-piperidyl)-1-propene --; line 44, for "an acidic" read -- a --; line 54, for "a dehydrating" read -- an acidic dehydrating --; column 10, line 1, for "an acidic" read -- a --.

Signed and sealed this 1st day of May 1962.

(SEAL)
Attest:

ERNEST W. SWIDER
Attesting Officer

DAVID L. LADD
Commissioner of Patents